United States Patent
Berger et al.

(10) Patent No.: US 7,582,143 B2
(45) Date of Patent: Sep. 1, 2009

(54) MOISTURE EXCHANGE MODULE HAVING BUNDLE OF MOISTURE PERMEABLE HOLLOW FIBRE MEMBRANES

(75) Inventors: Gerhard Berger, Ebersbach (DE); Gert Hinsenkamp, Kirchheim (DE); Jens Intorp, Ulm (DE); Patrick Mangold, Ulm (DE); Jochen Schaefer, Ulm (DE); Sven Schnetzler, Marburg (DE); Wolfgang Weger, Hochdorf (DE); Norbert Wiesheu, Guenzburg (DE)

(73) Assignee: Daimler AG, Stuttgart (DE)

( * ) Notice: Subject to any disclaimer, the term of this patent is extended or adjusted under 35 U.S.C. 154(b) by 482 days.

(21) Appl. No.: 11/117,629

(22) Filed: Apr. 28, 2005

(65) Prior Publication Data

US 2005/0247619 A1 Nov. 10, 2005

(30) Foreign Application Priority Data

May 4, 2004 (DE) ........................ 10 2004 022 312

(51) Int. Cl.
*B01D 53/22* (2006.01)
(52) U.S. Cl. ..................................... 96/8; 96/10; 95/52
(58) Field of Classification Search ........................ 96/4, 96/8, 10; 95/45, 52; 55/347, 348, 349, 447, 55/448, 449, 456, 457, 396, 421, 423, 450
See application file for complete search history.

(56) References Cited

U.S. PATENT DOCUMENTS

| 2,986,278 | A | * | 5/1961 | Bjorklund | 55/348 |
| 3,394,533 | A | * | 7/1968 | Li et al. | 55/337 |
| 3,796,026 | A | * | 3/1974 | Mugford | 55/338 |
| 4,141,835 | A | | 2/1979 | Schäel et al. | 210/321 |
| 4,255,174 | A | | 3/1981 | Simpson | 55/347 |
| 4,278,053 | A | | 7/1981 | Bessouat et al. | 122/488 |
| 4,300,918 | A | * | 11/1981 | Cary | 95/268 |
| 5,118,327 | A | * | 6/1992 | Nelson et al. | 95/10 |
| 5,169,412 | A | * | 12/1992 | Prasad et al. | 95/47 |

(Continued)

FOREIGN PATENT DOCUMENTS

DE  28 20 850  11/1978

(Continued)

OTHER PUBLICATIONS

Robert H. Perry. Perry's Chemical Engineers' Handbook, 6th edition, McGraw-Hill Book Company, pp. 18-70 to 18-75.

*Primary Examiner*—Duane Smith
*Assistant Examiner*—Robert A Clemente
(74) *Attorney, Agent, or Firm*—Davidson, Davidson & Kappel

(57) ABSTRACT

A moisture exchange module includes a bundle of moisture-permeable hollow fiber membranes. It is provided with a feedline for supplying a gas stream that flows through the hollow fiber membranes in an inner flow. According to the present invention, a separating device for separating out liquid particles from the gas flow are provided in the region between the feedline and the bundle of hollow fiber membranes. The separating device may have the form of a groove and are arranged in such a way that the gas flow is guided in such a manner that the centrifugal force assists movement of the liquid particles towards the separating device. The moisture exchange module preferably forms part of a fuel cell system to humidify feed air for the fuel cell system.

10 Claims, 2 Drawing Sheets

U.S. PATENT DOCUMENTS

| | | | |
|---|---|---|---|
| 5,632,805 A * | 5/1997 | Woodard | 96/4 |
| 5,641,337 A * | 6/1997 | Arrowsmith et al. | 95/39 |
| 5,885,329 A * | 3/1999 | Hermann | 95/22 |
| 5,961,678 A * | 10/1999 | Pruette et al. | 55/485 |
| 6,019,822 A * | 2/2000 | Kanzawa et al. | 96/8 |
| 6,149,408 A * | 11/2000 | Holt | 418/1 |
| 6,418,974 B1 * | 7/2002 | King | 139/383 R |
| 6,485,854 B1 | 11/2002 | Grover et al. | 429/17 |
| 6,540,802 B2 * | 4/2003 | Trautmann et al. | 55/337 |
| 6,540,817 B1 * | 4/2003 | Hachimaki | 96/8 |
| 6,540,818 B2 * | 4/2003 | Hachimaki | 96/8 |
| 6,554,261 B2 * | 4/2003 | Katagiri et al. | 261/154 |
| 6,653,012 B2 | 11/2003 | Suzuki et al. | 429/39 |
| 6,669,177 B2 | 12/2003 | Shimanuki et al. | 261/96 |
| 6,755,399 B2 * | 6/2004 | Shimanuki et al. | 261/104 |
| 6,923,845 B2 * | 8/2005 | Nichols et al. | 95/52 |
| 7,156,379 B2 * | 1/2007 | Tanihara et al. | 261/102 |
| 2005/0235826 A1 * | 10/2005 | Jensvold et al. | 95/52 |

FOREIGN PATENT DOCUMENTS

| | | |
|---|---|---|
| DE | 29 47 289 | 6/1980 |
| DE | 29 47 737 | 6/1980 |
| DE | 26 46 358 C2 | 5/1982 |
| DE | 696 08 194 | 12/2000 |
| DE | 101 51 665 | 5/2002 |
| DE | 102 14 078 | 10/2002 |
| DE | 103 09 794 | 9/2004 |
| EP | 1 275 432 | 1/2003 |
| EP | 1 323 478 | 7/2003 |
| GB | 1 594 524 | 7/1981 |
| JP | 8 155243 | 6/1996 |
| JP | 2002 289229 | 10/2002 |
| JP | 2002-298882 | 10/2002 |
| JP | 2002-298883 | 10/2002 |
| WO | WO 2004/020106 | 3/2004 |

* cited by examiner

MOISTURE EXCHANGE MODULE HAVING BUNDLE OF MOISTURE PERMEABLE HOLLOW FIBRE MEMBRANES

Priority is claimed to German Patent Application No. DE 10 2004 022 312.2, filed on May 4, 2004, the entire disclosure of which is incorporated by reference herein.

The present invention relates to a moisture exchange module having a bundle of moisture-permeable hollow fibre membranes. Furthermore, the present invention relates to the use of a moisture exchange module of this type.

BACKGROUND

Numerous moisture exchange modules of the generic type are known from the general prior art. By way of example, reference should be made at this point to the moisture exchange modules from JP 2002-298882, JP 2002-298883 and DE 102 14 078 A1. To obtain the highest possible exchange rate, these moisture exchange modules each have very complex flow paths.

Furthermore, these moisture exchange modules, as will be clear in particular from DE 102 14 078 A1, are subject to restrictions in use, since the inner flow through the hollow fibre membranes is always the flow of the gas stream that is to be humidified.

SUMMARY OF THE INVENTION

It is an object of the present invention to provide a compact, high-performance moisture exchange module which can be used flexibly in terms of the inner and outer flows through and around the hollow fibre membranes.

For further general prior art, reference is also made to EP 1 323 478 A2, which discloses what is known as a cyclone separator as a droplet separator, which makes use of constant changes in the direction of the gas stream to separate droplets out of the latter. The use of this separator to separate water out of a steam-water mixture generated by a fuel cell is also proposed.

The present invention provides a moisture exchange module having a bundle of moisture-permeable hollow fibre membranes, and a feedline for supplying a gas stream which flows through the hollow fibre membranes in an inner flow. Means for separating out liquid particles from the gas flow are provided in the region between the feedline and the bundle of hollow fibre membranes.

In principle, the means for separating liquid out of the gas stream offer the advantage that liquid droplets are removed from the gas stream, so that only a single-phase flow of gas or vapour, without any suspended liquid particles, is present within the hollow fibre membranes. Furthermore, it is impossible for any liquid particles to block the hollow fibre membranes of the bundle.

The fact that liquid particles are separated out makes the moisture exchange module more flexible in use, since it is now also possible for a humid gas stream to flow through the hollow fibre membranes without this leading to problems on account of the liquid particles or droplets contained therein. The problems primarily reside in the fact that the suspended liquid particles would increase the pressure loss of the two-phase flow that is then present in the hollow fibre membranes compared to the pressure loss with a pure gas or vapour flow.

The separation means used in this case is a simple groove which is arranged in a region in which the gas flow is routed in such a manner that the centrifugal force assists movement of the liquid particles towards the groove. Consequently, very good separation of the liquid particles can be achieved using a simple groove.

Furthermore, the means for separating liquid out of the gas stream can also prevent the possibility of the very small cross sections of the hollow fibre membranes through which these can flow from becoming blocked.

Preferably, the moisture exchange module according to the present invention may be used in a fuel cell system.

Accordingly, the moisture exchange module can be used in particular to dry and humidify process gas streams, for example to humidify the feed air for a fuel cell or a gas generation system by means of the moist exchange gas from the fuel cell. The compact and lightweight design combined, nevertheless, with a very high moisture exchange rate are of crucial importance depending on the structure and use of a fuel cell system of this type, for example as a drive system in vehicles or as an auxiliary power unit (APU). The moisture exchange module according to the present invention satisfies these requirements and therefore represents a very good moisture exchange module for the abovementioned use.

BRIEF DESCRIPTION OF THE DRAWINGS

Further advantageous configurations of the moisture exchange module according to the present invention will emerge from the claims and from the exemplary embodiments, which are explained in more detail below with reference to the drawings, in which:

DETAILED DESCRIPTION

Figure 1:
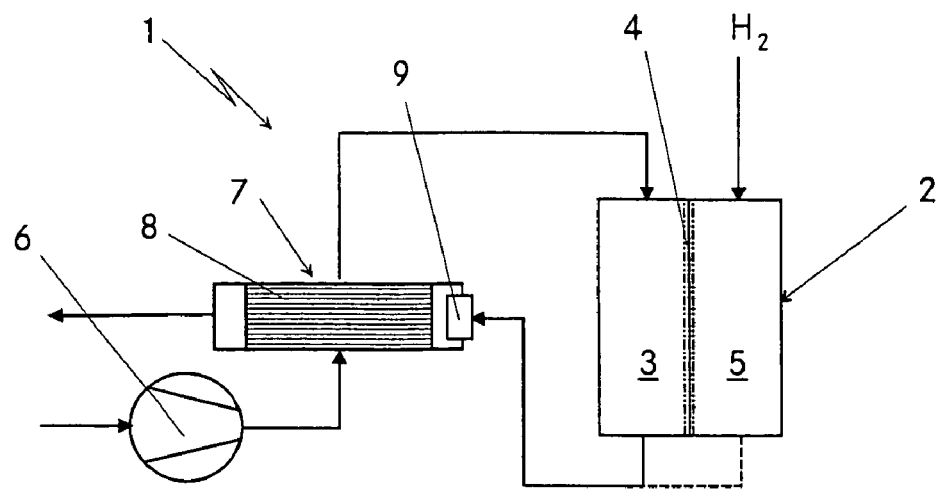
FIG. 1 shows a diagrammatically indicated fuel cell system having a moisture exchange module in accordance with the present invention.

FIG. 1 shows a highly diagrammatically indicated fuel cell system 1. This system comprises a fuel cell 2, in which a cathode space 3 is separated from an anode space 5 by means of a proton-conducting membrane (proton exchange membrane, PEM) 4. The fuel cell 2 can generate electric power from hydrogen ($H_2$) in its anode space 5 and air in its cathode space 3, in a manner which is known per se. The fuel cell 2 may be constructed as an individual fuel cell, but in particular is in the form of an array of a large number of fuel cells, i.e. what is known as a fuel cell stack. To protect the proton-conducting membrane 4 from drying out and being damaged as a result, the air supplied to the cathode space 3 via a compressor 6 is humidified by the exchange gases flowing out of the fuel cell 2 in a moisture exchange module 7, which is diagrammatically indicated. The moisture which is present in the exchange gas is transferred, through hollow fibre membranes that are permeable to water vapour, to the air flowing to the cathode space 3, so that the latter is humidified and in turn moistens the proton-conducting membrane 4. The proton-conducting membrane 4 is in this way protected against drying out and thereby being damaged and/or ageing prematurely.

In the exemplary embodiment of the moisture exchange module 7 illustrated here, the moist exchange gas from the fuel cell 2 for this purpose flows through a bundle 8 of hollow fibre membranes. The outer surfaces of which have the air that is to be humidified for the fuel cell 2 flowing around them. This structure is made possible by a means 9 for separating out liquid particles, which is located in the region of the feed-line for feeding the moist gas stream to the moisture exchange module 7. The means 9 remove liquid droplets from the gas stream, so that these droplets can neither block the hollow fibre membranes of the bundle 8 nor produce an increased pressure loss during flow through the hollow fibre membranes, on account of the two-phase flow. Therefore, the means 9 for the first time allow the moisture exchange module 7 to be connected up in the manner illustrated here without it having to be correspondingly overdimensioned in terms of the exchange capacity and size, for reasons of operational reliability, minimizing pressure loss and reliability.

The structure shown in FIG. 1, which has been made possible for the first time for use in a moisture exchange module 7 of minimized size as a result of the means 9 for separating out of the liquid particles, is very effective with regard to the compressor 6 being arranged upstream of the hollow fibre membranes around which medium is to flow, since the pressure loss is higher in the hollow fibre membranes themselves than during flow around them. However, this higher pressure loss can be kept within limits by the means 9, since these means prevent a two-phase flow of gas or vapour and suspended liquid particles, which would lead to a considerably higher pressure loss than a pure gas or vapour flow. Therefore, a higher internal pressure in the fuel cell 2 is possible for the same compressor power. Consequently, for a predetermined internal pressure, on the one hand the size and power of the compressor 6 and the energy consumption of the latter can be minimized, or on the other hand for a predetermined size and power of the compressor 6, the efficiency of the fuel cell 2 can be increased on account of the improved thermodynamics at a higher internal pressure.

Depending on the fuel cell system 1 used, the anode space 5 of the fuel cell 2 is supplied with hydrogen from a hydrogen store or with hydrogen which has been generated by a gas generation system, for example, from a liquid hydrocarbon. In the case of a pure hydrogen system, the anode space 5 is operated in dead-end mode or with an anode loop, whereas in the case of hydrogen generated in the gas generation system residual gases from the anode space 5 are discharged as exchange gas. Accordingly, the moist exchange gas used for humidification can originate either from the cathode space 3 alone or from the cathode space 3 and the anode space 5 together, as indicated in FIG. 1 by the connection in dashed lines linking the anode space 5 and the exchange gas from the cathode space 3. Furthermore, the humidified feed air can at least in part also be used in other ways than for supplying the cathode space 3, for example for providing at least some of the water quantity required to generate a hydrogen-containing gas, for example from a liquid hydrocarbon by means of autothermal reforming, steam reforming and an optional downstream water gas shift stage, as explained, for example, in DE 103 09 794.

The following statements each relate to this exemplary embodiment, presented above, of the moisture exchange module 7 in the fuel cell system 1. However, the present invention should not be restricted to applications of the moisture exchange module 7 of this nature.

In principle, all conceivable water and droplet separators may be used for the means 9 for separation of liquid particles. In order to achieve a compact design for the moisture exchange module 7, however, the means 9 should be integrated in the module or in the area of the supply line.

Figure 2:
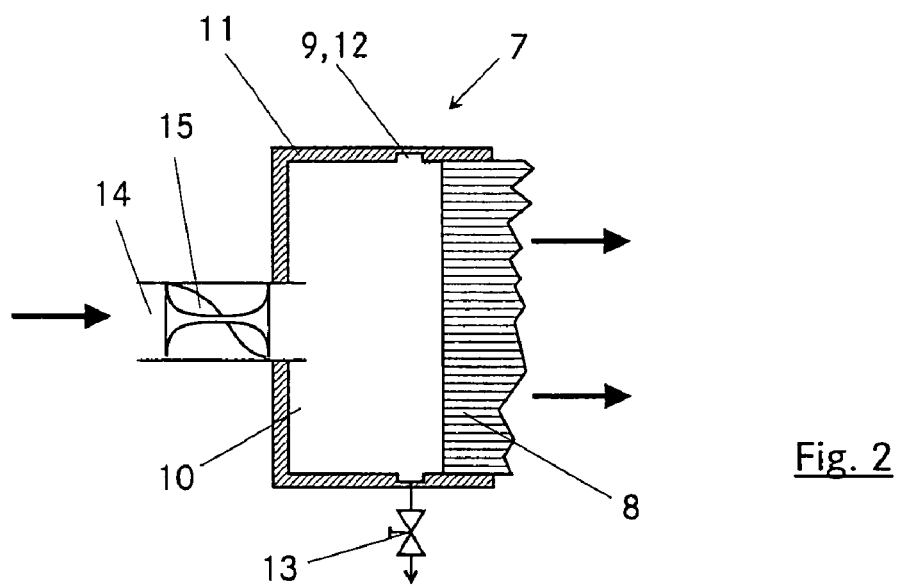
FIG. 2 shows a longitudinal section through a first embodiment of a diagrammatically indicated inflow region of the moisture exchange module according to the present invention.

FIG. 2 shows a first embodiment of an inflow region 10 for the gas stream in a housing 11 of the moisture exchange module 7. The means 9 for separating out the liquid particles are in this case designed as a groove 12 in the region of the wall of the inflow region 10. Liquid droplets can collect in this groove 12 and can then be discharged from the region of the means 9 by a device 13, indicated here in the form of a valve. To allow effective use to be made of the entire length of the groove 12, the latter may be arranged perpendicular to the flow or at least perpendicular to individual velocity components of the flow.

To increase the efficiency of the means 9, a line element 14, in the region of the feedline, has a means 15 for generating a swirling motion in the gas stream. This means 15 for generating a swirling motion in the gas stream may, for example, comprise a twisted strip or if appropriate, also a twisted element that is star-shaped in cross section. To produce a sufficient swirling motion in the gas stream combined with an acceptable flow resistance therein, the element or strip may be twisted through approx. 70° to 270°, in particular through approx. half a revolution (180°). The element or strip may, for example, consist of a corrosion-resistant sheet-metal material, a thermally stable plastic or the like.

In addition to improving the uniform distribution of the gas stream in the inflow region 10, which has a further beneficial effect on improved utilization of the hollow fibre membranes of the bundle and therefore ultimately on a more compact moisture exchange module 7, the swirling motion also significantly improves the effect of separating out the liquid particles. This is because the groove 12 is arranged in a region in which the gas stream, on account of its swirling motion, flows along the wall of the inflow region 10, so that liquid droplets which are present in the gas stream, as the heaviest constituents thereof, pass into the region of the groove 12 on account of centrifugal force and collect therein.

Figure 3:
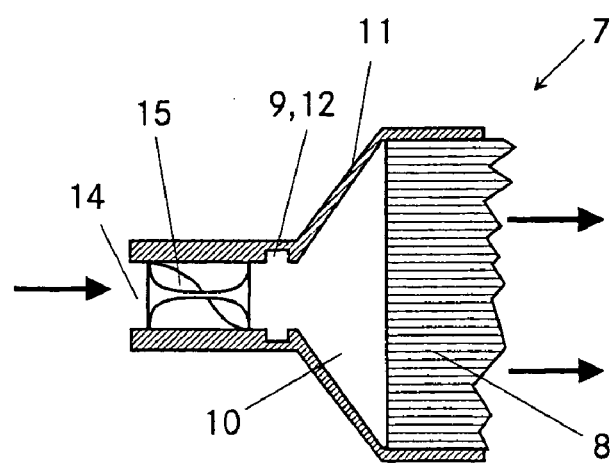
FIG. 3 shows a longitudinal section through a second embodiment of a diagrammatically indicated inflow region of the moisture exchange module according to the present invention.

The embodiment of the inflow region 10 which is illustrated in FIG. 3 differs from the embodiment illustrated in FIG. 2 only by the fact that the widening of the cross section is not sudden, but rather continuous. In this case too, it must be emphasized that the gas flow is very well distributed through the inflow region 10, which is of very short design, on account of the swirling motion produced by the means 15. The means 9 for separating out the liquid particles are in this case likewise designed in the form of a groove 12. However, this groove 12 is arranged in the region of the line element 14. On account of the centrifugal forces, which are also prevailing in this region on account of the swirling motion of the gas stream, a comparable effect to that described above results. Therefore, in this case too the liquid particles are separated out very successfully in the groove 12.

Figure 4:
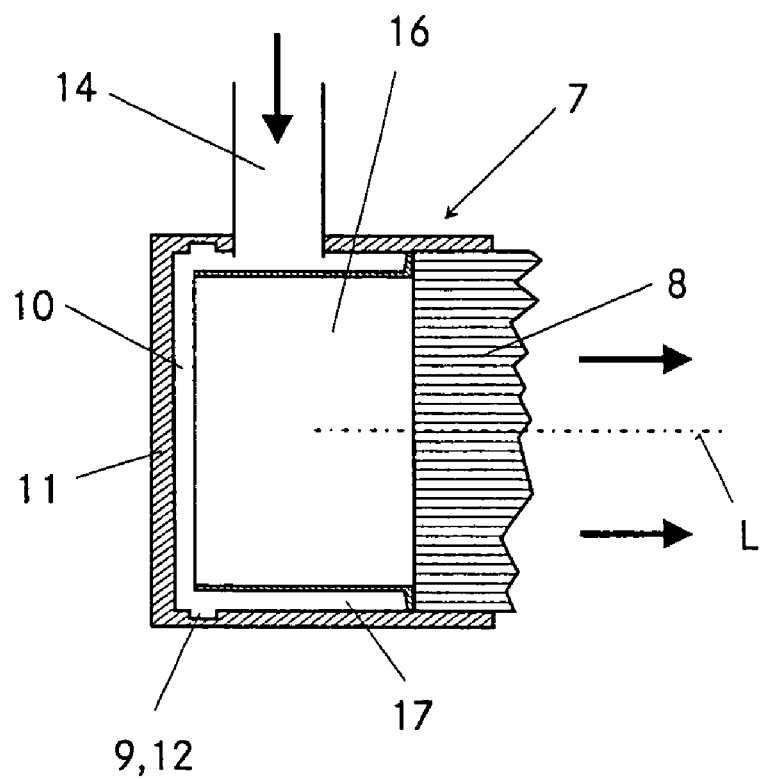
FIG. 4 shows a longitudinal section through a third embodiment of a diagrammatically indicated inflow region of the moisture exchange module according to the present invention.

FIG. 4 illustrates a further configuration of the moisture exchange module 7. To achieve a uniform distribution of the gas stream in the inflow region 10, an annular diverter means 16 is provided here, positioned between the line element 14, which is in this case arranged perpendicular to the longitudinal axis L of the bundle 8 of hollow fibre membranes, and the inflow region 10 in such a way that the gas stream cannot flow directly into the inflow region 10, but rather is always firstly diverted by the diverter means 16. The annular diverter means 16 is in this case configured in such a way that it forms an annular gap 17 between the diverter means 16 and the wall of the inflow region 10. This annular gap 17 is only connected to the inflow region 10 on its side remote from the bundle 8 of hollow fibre membranes, or is open in such a way that the gas stream can flow to the bundle 8 of hollow fibre membranes here.

The means 9 for separating out liquid particles are in this case too designed in the form of a groove 12. This groove 12 is arranged in the region where the gas stream is diverted by the diverter means 16, so that in this case too it is easier for the liquid particles to collect in the region of the groove 12, on account of the centrifugal force. In addition, in the case of the structure illustrated here, this can be improved still further if the gas stream is introduced into the annular gap 17 tangentially with respect to the bundle 8 of hollow fibre membranes, so that the gas stream, on account of flowing in tangentially, flows along the wall of the inflow region 10 or of the annular gap 17.

Of course, all of the embodiments of the means 9 illustrated here can be exchanged and combined with one another, likewise in combination with the different configurations of the inflow region 10 of the moisture exchange module 7, in each case with or without the means 15 for generating a swirling motion in the gas stream, the tangential connection, the devices 13 for discharging the liquid and/or the diverter means 16.

Figure 5:
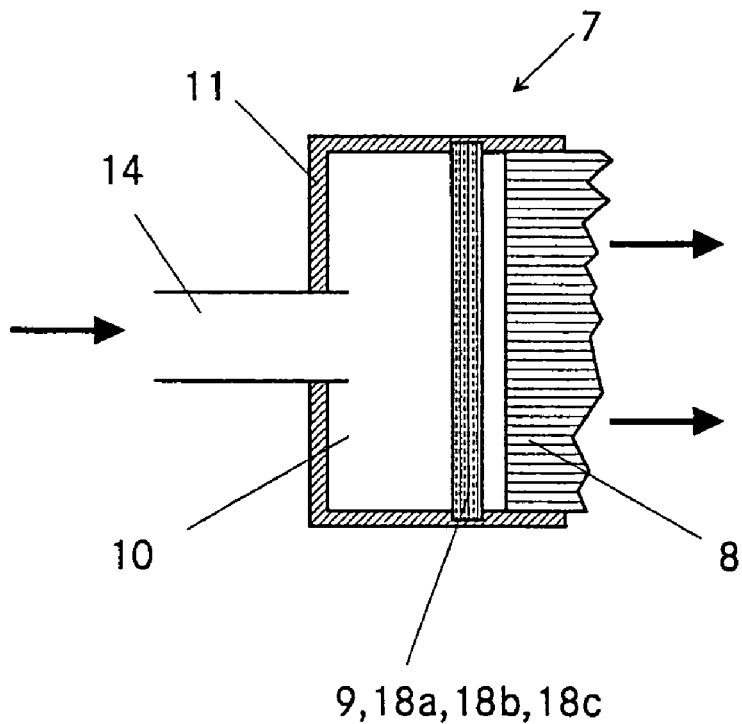
FIG. 5 shows a longitudinal section through a third embodiment of a diagrammatically indicated flow region of the moisture exchange module according to the present invention.

FIG. 5 shows further embodiments of moisture exchange module 7 with a means 9 for separating out the liquid particles 9 formed as a grid 18a, perforated metal sheets 18b or a knitted fabric 18c.

What is claimed is:

1. A moisture exchange module comprising:
   a bundle of moisture-permeable hollow fibre membranes;
   a housing for the bundle of moisture-permeable hollow fibre membranes;
   a feedline for supplying a gas stream which flows through the hollow fibre membranes, the feedline contacting the housing at a housing contact; and
   a separating device disposed in a region between the housing contact and the bundle of hollow fibre membranes and configured to separate out liquid particles from a flow of the gas stream.

2. The moisture exchange module as recited in claim 1, wherein the separating device includes a groove in a wall of the housing.

3. The moisture exchange module as recited in claim 2, wherein the groove is aligned substantially perpendicular to a direction of at least velocity components in the gas stream.

4. The moisture exchange module as recited in claim 2 wherein a discharge valve is attached to a groove.

5. The moisture exchange module as recited in claim 1, further comprising an inflow region between the feedline and the bundle of hollow fibre membranes and wherein the separating device includes a groove in a wall of the inflow region.

6. The moisture exchange module as recited in claim 1, wherein the separating device includes at least one of grids, perforated metal sheets, and a knitted fabric.

7. The moisture exchange module as recited in claim 1, wherein the separating device is disposed in a flow of the gas stream that is guided so that a centrifugal force assists movement of the liquid particles towards the separating device.

8. The moisture exchange module as recited in claim 1, wherein separating device includes discharging devices configured to discharge collected liquid from the region.

9. The moisture exchange module as recited in claim 1, wherein the moisture exchange module forms part of a fuel cell system.

10. The moisture exchange module as recited in claim 9, wherein the moisture exchange module humidifies feed air for the fuel cell system, the feed air being delivered into the fuel cell system along outer surfaces of the hollow fibre membranes using a compression device, and wherein the gas stream includes a moist exchange gas from a fuel cell of the fuel cell system.

* * * * *